United States Patent
Thota et al.

(10) Patent No.: US 9,677,007 B2
(45) Date of Patent: *Jun. 13, 2017

(54) CARBON MONOXIDE COMBUSTION CATALYST AND A PROCESS OF PREPARATION THEREOF

(75) Inventors: Chiranjeevi Thota, Uttar Pradesh (IN); Dattatraya Tammannashastri Gokak, Uttar Pradesh (IN); Ravikumar Voolapalli, Uttar Pradesh (IN); Venkateswarlu Choudary Nettem, Uttar Pradesh (IN); Mohammad Amir Siddiqui, Uttar Pradesh (IN); Rajan Bosco, Gujarat (IN); Raghunath Prasad Mehrotra, New Delhi (IN)

(73) Assignees: Bharat Petroleum Corporation Limited, Mumbai (IN); Sud-Chemie India Pvt LTD, New Delhi (IN)

( * ) Notice: Subject to any disclaimer, the term of this patent is extended or adjusted under 35 U.S.C. 154(b) by 1037 days.

This patent is subject to a terminal disclaimer.

(21) Appl. No.: 13/322,485

(22) PCT Filed: Dec. 30, 2009

(86) PCT No.: PCT/IN2009/000756
§ 371 (c)(1),
(2), (4) Date: Mar. 8, 2012

(87) PCT Pub. No.: WO2010/137029
PCT Pub. Date: Dec. 2, 2010

(65) Prior Publication Data
US 2012/0157293 A1 Jun. 21, 2012

(30) Foreign Application Priority Data
May 25, 2009 (IN) .................. 1290/MUM/2009

(51) Int. Cl.
| | | |
|---|---|---|
| *B01J 29/06* | (2006.01) |
| *C10G 11/05* | (2006.01) |
| *B01J 29/068* | (2006.01) |
| *B01J 29/072* | (2006.01) |
| *B01J 29/076* | (2006.01) |
| *B01J 29/08* | (2006.01) |
| *B01J 29/12* | (2006.01) |
| *B01J 29/14* | (2006.01) |
| *B01D 53/86* | (2006.01) |
| *B01J 23/00* | (2006.01) |
| *B01J 23/42* | (2006.01) |
| *B01J 23/96* | (2006.01) |
| *B01J 29/16* | (2006.01) |
| *B01J 29/90* | (2006.01) |
| *B01J 35/02* | (2006.01) |
| *B01J 38/68* | (2006.01) |
| *C10G 11/18* | (2006.01) |
| *B01J 35/00* | (2006.01) |
| *B01J 35/10* | (2006.01) |
| *B01J 38/12* | (2006.01) |

(52) U.S. Cl.
CPC ............ *C10G 11/05* (2013.01); *B01D 53/864* (2013.01); *B01J 23/002* (2013.01); *B01J 23/42* (2013.01); *B01J 23/96* (2013.01); *B01J 29/061* (2013.01); *B01J 29/068* (2013.01); *B01J 29/072* (2013.01); *B01J 29/076* (2013.01); *B01J 29/085* (2013.01); *B01J 29/12* (2013.01); *B01J 29/14* (2013.01); *B01J 29/16* (2013.01); *B01J 29/90* (2013.01); *B01J 35/023* (2013.01); *B01J 35/109* (2013.01); *B01J 38/68* (2013.01); *C10G 11/182* (2013.01); *B01D 2255/1021* (2013.01); *B01D 2255/2027* (2013.01); *B01D 2255/2047* (2013.01); *B01D 2255/2092* (2013.01); *B01D 2255/20723* (2013.01); *B01D 2255/20738* (2013.01); *B01D 2255/20753* (2013.01); *B01D 2255/702* (2013.01); *B01D 2255/9205* (2013.01); *B01J 35/002* (2013.01); *B01J 35/1019* (2013.01); *B01J 35/1038* (2013.01); *B01J 38/12* (2013.01); *B01J 2229/20* (2013.01); *B01J 2523/00* (2013.01); *C10G 2300/1074* (2013.01); *C10G 2300/701* (2013.01); *C10G 2300/708* (2013.01); *Y02P 30/446* (2015.11)

(58) Field of Classification Search
USPC .......... 502/63, 64, 65, 66, 67, 68, 69, 73, 74
See application file for complete search history.

(56) References Cited

U.S. PATENT DOCUMENTS

| | | |
|---|---|---|
| 3,140,264 A | 7/1964 | Oleck et al. |
| 4,118,339 A | 10/1978 | Latos |
| 4,265,787 A | 5/1981 | Schwartz |
| 4,285,806 A | 8/1981 | Mooi |
| 5,538,624 A * | 7/1996 | Hettinger .................. 208/121 |

FOREIGN PATENT DOCUMENTS

WO 2005/037745 A1 4/2005

* cited by examiner

*Primary Examiner* — Elizabeth Wood
(74) *Attorney, Agent, or Firm* — Ladas & Parry LLP

(57) ABSTRACT

A carbon monoxide combustion catalyst and a method of making the catalyst used in fluid bed catalytic cracking process. The catalyst can contain metals and other composites which promote oxidation of carbon monoxide to carbon dioxide during regeneration of spent FCC catalyst.

22 Claims, 1 Drawing Sheet

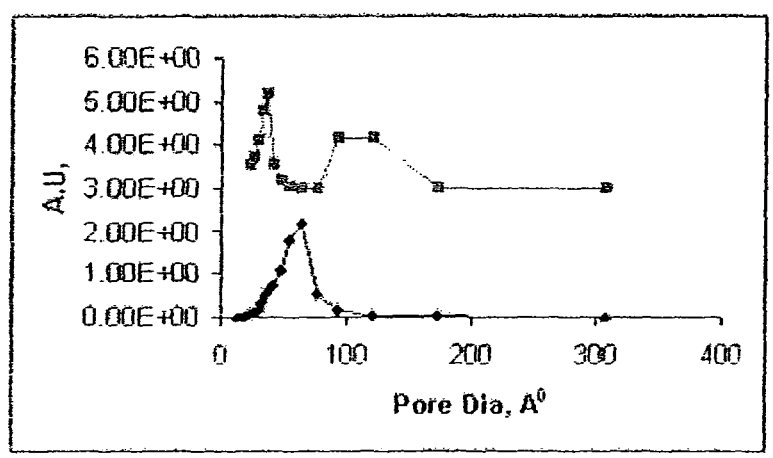

CARBON MONOXIDE COMBUSTION CATALYST AND A PROCESS OF PREPARATION THEREOF

This is a 371 application of PCT/IN2009/000756 filed on Dec. 30, 2009.

The present invention results from the activities undertaken within the scope of a joint research agreement between Bharat Petroleum Corporation Limited (BPCL) and Sud Chemie India Pvt Ltd.(SCIL).

FIELD OF THE INVENTION

The present invention relates to a combustion catalyst. More particularly, the present invention provides a carbon monoxide combustion catalyst for use in fluid catalytic cracking. The present invention also provides a method for the manufacture of the said catalyst using spent catalyst and reduction of carbon monoxide formation and effective heat recovery and utilization during regeneration. In one aspect the invention also relates to use of a promoter catalyst made from the discarded material.

BACKGROUND OF THE INVENTION

Disposal of used catalysts poses a tremendous problem worldwide in terms of safety as well as environmental impact. Spent catalysts from various chemical processes contain potentially toxic material impregnated therein which can leach out into the environment. In addition, the handling of such spent catalysts during disposal also requires special efforts to ensure that potentially toxic chemical residues therein do not have an adverse impact on the personnel handling the disposal.

Fluid catalytic cracking (FCC) processes result in emission of carbon monoxide. As a result of this, there is considerable pressure on refiners, to reduce emissions of carbon monoxide from FCC regenerator flue gas and to dispose safely used catalysts. Reduction of carbon monoxide in some cases been achieved by the use of incinerators or carbon monoxide boilers. Although these serve the purpose, it involves substantial capital investment. Carbon monoxide boilers may create problem with respect to maintenance and repair. Whenever carbon monoxide combustion system is taken out for various reasons, there is increase in carbon monoxide emissions from the FCC regenerator. The disposal of used catalysts is done in many ways like down grading the material and using for other application or sent for metal recovery.

Therefore, in order to maintain the purity of stack gas within allowable limits, it has been thought necessary to have support carbon monoxide control systems or modify the operation of the whole FCC by use of an external agent to reduce emissions of carbon monoxide from FCC regenerator flue gas and also to utilize effectively the heat generated during the carbon monoxide combustion process.

U.S. Pat. No. 4,064,039 discloses a catalyst containing Pt or Re which improves carbon monoxide burning in regenerator dense bed. This patent describes the use of modified fresh cracking catalyst with platinum group metal.

U.S. Pat. No. 4,915,037 teach the use of low surface area porous support having surface area greater than 50 $m^2/g$ which contains silica, alumina, silica/alumina, Kaolin and mixtures containing Pt, Rh, that improves carbon monoxide oxidation.

Escardino et al (British Ceramic Transactions (1999), 98(4), 172-177) discuss the use of spent FCC catalyst for making 4A-Zeolite.

U.S. Pat. No. 4,148,751 describes the use of alumina supported platinum as better additive compared to Pt containing fresh FCC catalyst.

Notwithstanding the amount of material available in the prior art, there is still need for a combustion catalyst which can either be freshly prepared or comprise regenerated catalytic material from FCC processes which provides a good consistent carbon monoxide combustion level with better physical properties.

OBJECTS OF THE INVENTION

Accordingly the main object of the invention is to provide a carbon monoxide combustion catalyst for use in fluid catalytic cracking with improved combustion levels.

It is another object of the invention to provide a carbon monoxide combustion catalyst which can comprise either fresh support or re-generated material using spent catalyst.

It is another object of the invention to provide a method for the manufacture of the catalyst as well as to improvements in the control of coke on spent catalyst and reduction of carbon monoxide formation and effective heat recovery and utilization during FCC catalyst regeneration.

It is another object of the invention to provide a catalyst that retains its activity while also improving attrition strength that are comparable or better than those known in the art.

SUMMARY OF THE INVENTION

Accordingly, the present invention provides an active and attrition resistant carbon monoxide combustion catalyst for use in fluid catalytic cracking, comprising as active elements:
  (i) from 0.001 to 1% by weight of a noble metal
  (ii) from 0 to 0.25% by weight of a metal of Group I A
  (iii) from 0 to 0.7% by weight of a metal of Group IIA
  (iv) from 0.45 to 1% by weight of a metal of Group III A
  (v) from 0.3 to 1% by weight of a metal of Group IV A
  (vi) from 0 to 0.7% by weight of a metal of a Group V
  (vii) from 0 to 1.2% by weight of rare earth oxides
  (viii) from 0 to 0.45% by weight of a metals of Group VIII
along with inorganic oxide, natural clay and a zeolite component wherein said catalyst chemical composition is incorporated on a supported material.

According to one embodiment, the present invention relates to a method of making improved carbon monoxide combustion catalyst by use of regenerated spent catalyst comprising of composite materials for use in fluid catalytic cracking process, wherein regenerated spent catalyst has a bimodal pore distribution in the range of 20-50° A and 80-100° A.

In another embodiment, the carbon monoxide combustion catalyst have noble metal component along with other metals/elements or their compounds from group I, II, III, IV, V, and VIII.

In yet another embodiment, group I metal is sodium.
In another embodiment, group II metal is magnesium.
In another embodiment, III metal is aluminium.
In another embodiment, group IV element is carbon.
In another embodiment, group V metals are vanadium and phosphorous.

In another embodiment, VIII metals are nickel and iron.

In another embodiment, noble metal is platinum and is present as an elemental metal.

In another embodiment, catalyst contains rare earth oxides.

In a further embodiment, the carbon monoxide combustion catalyst comprises 1-56 wt % crystalline alumino silicate or zeolite, 1-45 wt % porous alumina, 0-0.45 wt % Fe, 0-0.07 wt % Nickel, 0-0.06 wt % Vanadium, 0.01-0.25 wt % sodium, 0-0.6 wt % P, 0-0.7 wt % MgO, 0.-1.2 wt % $Re_2O_3$, in association with binder material and clay.

In yet another embodiment, the noble metal platinum may be incorporated on a porous material by either equilibrium adsorption or wet impregnation method (Ref: Catalyst and Surface Science Ed. Heinz Heinamnn Gabor A, Somorjai CRC Press 1985) either at room temperature or at slightly above.

In yet another embodiment, regenerated spent catalyst have characteristic properties like surface area in the range of 100-200 $m^2/g$, matrix surface area of about 10-50 $m^2/g$, micro pore volume of to 0.1 ml/g, apparent bulk density in the range of 0.7-0.9 g/ml, attrition index of about 1-5 wt % and average particle size of 70-85 Microns.

In another embodiment, spent catalyst may contain the elements from group I, II, III, IV, V, and VIII.

In another embodiment, spent catalyst contains carbon in the range of 0.3-1 wt %.

In yet another embodiment, the present invention relates to use of catalyst for converting carbon monoxide with the composition set forth above.

In yet another embodiment, the present invention relates to a method for catalytically oxidizing carbon monoxide in dense bed FCC regenerator by contacting with spent catalyst, air and promoter catalyst under regeneration conditions.

In yet another embodiment, platinum metal is in the range of 0.001 to 1 wt %, calculated as the elemental metal dispersed on a mixture of inorganic porous support and crystalline zeolite along with other metals such as Ni, V, Na, Fe, C, P, MgO, Cu, rare earth oxides and is particularly effective in carbon monoxide oxidation, with better attrition strength while having additional beneficial effect on yield.

BRIEF DESCRIPTION OF THE ACCOMPANYING DRAWING

Preferred embodiments of the invention can be more fully understood by reference to the following detailed description of the invention and to the accompanying drawing, in which FIG. 1 shows comparative pore size distribution of supports used for making the promoter additive.

DETAILED DESCRIPTION OF THE INVENTION

It is common commercial practice world wide to produce gasoline, heating oil and diesel fuel by cracking heavier petroleum fractions to these lighter, more valuable materials. One of the major commercial techniques for accomplishing this conversion is through fluid catalytic cracking (FCC). In FCC a fraction of petroleum feed such as vacuum gas oil, is contacted with particles of hot, reactive catalyst at high temperatures and low pressures of about 1 to 4 atmospheres. The catalyst should be in adequate quantity and temperature to vaporize the feed, raise the oil feed to a cracking temperature of about 480° C. to 590° C. and supply the endothermic heat of reaction. The oil and catalyst flow together for hydrocarbon conversion to occur. During the conversion of the heavy petroleum fraction to lighter fractions, by product coke is deposited on the catalyst particles thereby deactivating them, and thus coked, cooled catalyst particles are separated from cracked petroleum product. The product recovered and cooled, coked catalyst transported to regenerator. In the regenerator the coked catalyst is combined with air where coke is burned off and the catalyst is regenerated. The heated reactivated catalyst is then returned to admixture with further oil feed thus completing the cycle. FCC processes are heat balanced. That is the burning of coke in the regenerator provides sufficient heat, including loses, to persuade all of the heat requirements of the systems. There is a firm liaison between the amount of coke produced during cracking, coke burned off during regeneration and the heated catalyst returns to the cracking side of the process. This combination is not totally independent and controllable because it is in turn partly influenced by the nature of the petroleum fraction to make more or less coke under a given set of cracking conditions.

It has been the usual FCC operational practice to work out a balance of all of the effects and counter effects to adjust feeds, residence times, etc., to achieve a heat balanced operation. Hence the type of feed, feed rate, feed temperature, type of catalyst, catalyst to oil ratio, contact time, reaction temperature etc., are adjusted on the cracking side so as to produce a desirable product slate while depositing ample amount of coke on the catalyst to satisfy the system.

Changes that may occur in the system, such as inherent coking tendency of the feed or catalyst, over which the refiner has no control, is managed with heat exchangers and airflow rates and/feed pre-heaters to adjust operations to the peculiar requirements of particular situations.

There has always been a need for refiners, to reduce emissions of carbon monoxide from FCC regenerator in the flue gas. This has in some cases been accomplished through the use of carbon monoxide boilers. Though these work well, but require sizeable capital investment and they pose a problem with respect to maintenance and repair. Thus when a separate on stream carbon monoxide combustion system is taken out of line for routine or emergency repair and maintenance, there are an inherit increase in the carbon monoxide emission from the FCC regenerator. As a result to maintain the purity of stack gas within tolerable limits, it has been considered necessary to have backup carbon monoxide control systems or to modify the operation of the whole FCC or to vary from emission control requirements.

More recently substantial progress has been made towards modifying the operation of an FCC process so as to reduce carbon monoxide in the regenerator off gas by reducing or eliminating the need for downstream carbon monoxide combustion facilities. This is being accomplished by either increasing the air feed to the regenerator or by the use of carbon monoxide promoter catalyst. Burning carbon monoxide in the regenerator tends to increase the heat generated in the regenerator. This has some beneficial effects upon some FCC operations in that it reduces residual carbon on regenerated catalyst, it may permit a reduction in catalyst inventory, and or a lower catalyst to oil ratio, and or a higher cracking temperature. It may permit cracking feed stocks which are inherently low coke makers because burning less coke substantially all the way to carbon dioxide may generate sufficient heat to make up for the smaller amount of coke.

Burning of coke deposits from the catalyst in the regeneration zone may be represented in a simplified manner by the following chemical equations.

$$C + O_2 \rightarrow CO_2 \quad\quad\quad 1)$$

$$2C + O_2 \rightarrow 2CO \quad\quad\quad 2)$$

$$2CO + O_2 \rightarrow 2CO_2 \quad\quad\quad 3)$$

Reactions (1) and (2) both occur under typical catalyst regeneration conditions where in the catalyst temperatures may range from about 565 to 704° C. and are exemplary of gas solid chemical interactions when regenerating catalyst at temperatures within this range. The effect of any increase in temperature is reflected in an increase rate of combustion of carbon and a more complete removal of coke from the catalyst particles. Gas phase reaction (3) is also accelerated by increased temperature as well as higher pressure and, particularly when the excess of oxygen present. Some what lower temperatures may be employed where an added carbon monoxide combustion catalyst or promoter is employed. The promoter may be incorporated into the catalyst or introduced into the regeneration zone separately. In addition to the above reactions which relate to the formation of carbon monoxide from carbon, water is formed from hydrogen in the coke.

Use of theoretical amount of oxygen sufficient to burn coke in the fluidized catalyst to a desired low level of residual coke upon regenerated catalyst has the frequent undesirable effect of evolving a combustible mixture of oxygen and carbon monoxide in the dilute catalyst phase, which may undergo further combustion (commonly referred to as after burning). After burning causes a substantial increase in temperature of the dilute catalyst phase and may reach 815° C. Such high temperature in the dilute catalyst phase can cause catalyst deactivation, thereby requiring additional catalyst replacement to the process in order to maintain a desired catalytic activity in the hydrocarbon reaction zone. Additionally these high temperatures may cause damage to hardware components of the regeneration zone.

The present invention is illustrated and supported by the following representative examples, which are not intended to restrict the scope of the present invention in any manner. The following examples demonstrate the procedure for making the catalyst described in the present invention. These examples also compare various approaches made to arrive at a better formulation.

EXAMPLE-1

Promoter catalyst to improve the carbon monoxide conversion rate were prepared by using a commercially available porous, high surface area γ-alumina powder with an average particle size of about 20-120 microns as support. The support material contains unimodal pore distribution having majority of the pores in the range of 20-100° A. The support was dried by heating in glass reactor at 500° C. in air for 4 Hrs, before incorporating noble metal platinum. Three sets of carbon monoxide promoter catalysts were prepared by depositing desired amount of Pt (0.03, 0.05 & 0.1 wt %) on to the support by wet impregnation method using platinum metal salt. After impregnation the material was dried at 110-120° C. for 10 Hrs and calcined at 490-500° C. for 4 Hrs. These samples are referred to as catalysts-1, 2, 3 respectively.

The carbon monoxide combustion activity studies were carried out in a separate set up consisting of a fixed bed glass reactor, a condenser, gas liquid separator and an online CO—CO$_2$ analyzer. The reactor was heated using an electric furnace and PID temperature controller/programmer. The analyzer was calibrated with calibration gas of CO—CO$_2$ before starting the experiment. A known weight of spent catalyst without any combustion catalyst and amount of carbon monoxide formed by burning the same in air is taken as the basis for measuring the activity of catalyst. Each experiment was repeated thrice and the average value is taken for calculation. Since amount of CO$_2$ formed was large enough and crossing the limits of analyzer hence only amount of carbon monoxide formed is considered for this study. The above described catalyst had the following characteristics and activity (Table-1).

TABLE 1

| | Property of Support | | | |
|---|---|---|---|---|
| | SA (m²/g) | AI (Wt %) | ABD (g/cc) | APS (μ) |
| Corresponding value | 332 | 10 | 0.8 | 56 |
| Name of Catalysts | Catalyst-1 | Catalyst-2 | Catalyst-3 | |
| CO conversion activity (%) (w.r.t base case) | 98 | 94 | 87 | |

Though the above carbon monoxide promoter catalyst (Catalyst 1 & 2) is meeting all the requirements including activity for 0.03 Wt % metal deposited sample is not considered as better combustion catalyst because of its poor attrition strength which creates problem during FCC operation and not preferred by refiners.

EXAMPLE-2

Another commercial support with properties as given below (Table-2) was tried to make another better carbon monoxide combustion catalyst. The support had medium surface area (190 m²/g) with unimodal pores in different range (30-300° A) compared to the one sited in example-1.

The support was dried by heating at 500° C. in air for 4 Hrs, before incorporating noble metal platinum. Four sets of catalysts were prepared by depositing different amount of Pt (0.03, 0.04, 0.045 & 0.05 Wt %) on to the support by wet impregnation method using platinum metal salt. (Ref: Catalyst and Surface Science Ed. Heinz Heinamnn Gabor A, Somorjai CRC Press 1985). Impregnated material was dried at 120° C. for 10 Hrs and calcined at 500° C. for 4 Hrs. These samples are referred to as catalysts-4, 5, 6 and 7 respectively.

The carbon monoxide combustion activity studies were carried out in the same set up as described in the above example-1. Each experiment was repeated thrice and the average value is taken for calculation. The above described catalyst had the following characteristics and activity (Table-2).

TABLE 2

| | Property of Support | | | |
|---|---|---|---|---|
| | SA(m²/g) | AI (Wt %) | ABD (g/cc) | APS (μ) |
| Corresponding value | 190 | 7 | 0.8 | 81 |
| Name of Catalysts | Catalyst-4 | Catalyst-5 | Catalyst-6 | Catalyst-7 |
| CO conversion activity (%) (w.r.t base case) | 83 | 75 | 73 | 41 |

These catalysts were not considered as better promoters because the activity as well as attrition strength is poor. There is no linear correlation between metal loading and activity. Hence the support is not considered for making the catalyst.

EXAMPLE-3

In another breakthrough invention carbon monoxide combustion catalysts were prepared by using a pretreated spent commercial FCC cracking catalyst as support. Spent catalyst samples are collected from two different FCC units processing different types of feeds and catalysts. Based on the literature study (Fluid Catalytic Cracking hand book by Reza Sadeghbeigi published by Gulf publishing Company Houston, Tex. 1995 Pages 79-120) we presume that the FCC spent catalyst believed to be a composite material which may contain alumina, silica and natural clay based material whose catalytic activity had diminished compared to the very high activity associated with fresh. The loss in activity is mainly due to series of hydrothermal and cracking reactions. Based on the published information we believe that the spent catalyst contains about 20-45 wt % of a zeolite mostly with wide pores like Y or X type and 20-45 wt % of an alumina component, remaining being clay, silica, transition metals, MgO and carbon. The spent catalyst comes as a fine powder with an average particle size of about 60-80 microns. The particular samples of the commercial catalyst used in these experiments were drawn from the striper outlet of a commercial FCC plants running under steady state conditions. Physical properties of the spent catalysts are as given below. The spent catalyst which is used as support material contains bimodal pore size distribution having pores in the range of 20-50° A and 80-100° A (FIG. 1). Coke on spent catalysts was burned off by controlled heating in pure oxygen/air/mixture thereof in appropriate composition for 2-6 Hrs at 300-550° C. at 2-50° C./min. Two catalysts were prepared using these coke burned samples following the same procedure as described in examples 1&2 with fixed composition of 0.05 wt % platinum. Apart from the noble metal the catalysts also contained other metals like 0.1-0.45 wt % Fe, 0.02-0.07 Wt % Ni, 0.02-0.06 Wt % vanadium, (0.01-0.25 wt % sodium, 0.01-0.6 wt % P, 0.01-0.7 wt % MgO, 0.05-1.2 wt % $Re_2O_3$. The so prepared catalysts were referred as catalyst-8 & 9 (Table-3).

TABLE 3

| Property | Catalyst-8 | Catalyst-9 |
|---|---|---|
| SA ($m^2/g$) | 189 | 196 |
| AI (Wt %) | 2 | 5 |
| ABD (g/ml) | 0.9 | 0.8 |
| APS (μ) | 75 | 74 |
| CO Conv. Activity (%) (w.r.t base case) | 94 | 93 |

Catalysts 8 & 9 have better physical properties, good attrition strength and activity were found to be better compared to earlier catalysts (Catalysts 1 to 7) which were prepared using commercial supports.

EXAMPLE-4

In order to ensure the use of FCC spent catalyst as support for making the carbon monoxide combustion catalyst, a synthetic support with the composition same as that of FCC catalyst was prepared and simulated to make E-cat by metal and steam deactivation in accordance with the procedure published by us (Ref: Catalysis Today Vol 141 (1-2) March 2009 Pg 115-119) and the same after coke burning were used as supports for making carbon monoxide promoter catalyst along with 0.05 Wt % Pt metal deposition as per the method described in earlier examples (1-3). The effect of various metals present on spent FCC catalyst and their concentration was also seen on the activity of CO combustion and results are as given below (Table-4).

TABLE 4

| Property | Synthetic-1 | Synthetic-2 |
|---|---|---|
| SA ($m^2/g$) | 187 | 198 |
| AI (Wt %) | 4 | 6 |
| ABD (g/ml) | 1 | 0.8 |
| APS (μ) | 76 | 79 |
| Metals | | |
| Pt (wt %) | 0.05 | 0.05 |
| Ni (Wt %) | 0.04 | 0.21 |
| V (Wt %) | 0.51 | 0.33 |
| Na (wt %) | 0.23 | 0.40 |
| Fe (wt %) | 0.39 | 0.42 |
| MgO (wt %) | 0.05 | 0.23 |
| C (Wt %) | 0.01 | 0.01 |
| $Al_2O_3$ (wt %) | 44.00 | 42.50 |
| $Re_2O_3$ (wt %) | 01.42 | 01.50 |
| Zeolite (wt %) | 38.00 | 39.45 |
| Clay | 15.30 | 14.9 |
| CO Conv. Activity (%) (w.r.t base case) | 94 | 93 |

The above results show that FCC spent catalyst can be used very effectively even in presence of metals like Ni, V, Na, Iron and rare earth oxides in the range discussed above.

The present invention may be applied beneficially to make carbon monoxide combustion catalyst. According to this invention either fresh FCC catalyst or preferably carefully coke burned certain FCC spent catalyst with limitation to the quantity of trace metals deposited onto it act as superior supports for making the so called above said catalyst. The catalyst support being both high attrition resistant (Table-3) and also possessing cracking, activity (Table-5) possess long life in the Catalytic Fluid Bed unit. In addition since the spent catalyst support contain other metals which inhibit the accessibility of finely dispersed platinum metal coming in contact with sulphur and nitrogenous compounds generally present in Vacuum Gas Oil (VGO) hence increasing the life of the additive.

TABLE 5

Cracking activity of carbon monoxide combustion additive

| | % Yield | |
|---|---|---|
| Product | With E-cat | With CO Promoter catalyst |
| Dry gas | 1.6 | 1.8 |
| Hydrogen | 0.05 | 0.5 |
| LPG | 18.9 | 19 |
| Gasoline | 38.8 | 38.7 |
| TCO | 23.4 | 23.1 |
| Bottoms | 12.6 | 12.0 |
| Coke | 4.6 | 4.9 |
| Conversion | 64.1 | 64.7 |

MAT Reaction Conditions:
Temperature: 500° C., Cat/oil: 6.5, Feed Injection Rate: 2.25 gm/min
Qty of catalyst: 6.5 Gms

ADVANTAGES OF THE PRESENT INVENTION

1. The method of making carbon monoxide combustion catalyst for FCC uses novel support with distinct pore size distribution 2. Carbon monoxide combustion catalyst has better Attrition Resistance property.

3. The method of making carbon monoxide combustion catalyst for FCC is cost effective.

We claim:

1. An active and attrition resistant combustion catalyst for fluid catalytic cracking, comprising:
   (a) a support comprising a spent catalyst from a fluid catalytic cracking process, the spent catalyst comprising an inorganic oxide, natural clay, a zeolite component with wide pores selected from X or Y type zeolite, and a plurality of active elements including
      (i) from 0 to 0.25% by weight of a metal of Group I A;
      (ii) from 0 to 0.7% by weight of a metal of Group II A;
      (iii) from 0.45 to 1% by weight of a metal of Group III A;
      (iv) from 0.3 to 1% by weight of a metal of Group IV A;
      (v) from 0.01 to 0.7% of a Group V metal;
      (vi) from 0 to 1.2% by weight of a rare earth oxide; and
      (vii) from 0 to 0.45% by weight of a metal of Group VIII; and
   (b) platinum as a noble metal in an amount of 0.001 to 1% by weight dispersed on the spent catalyst support;
   wherein the plurality of active elements inhibit accessibility of the platinum from coming in contact with sulfur and nitrogenous compounds in a gaseous petroleum feed during fluid catalytic cracking and thereby increase a life of the platinum.

2. The catalyst as claimed in claim 1, wherein the zeolite component is present in the range of 1 to 56% by weight.

3. The catalyst as claimed in claim 1, wherein the spent catalyst contains bimodal pore distribution having pores in the range of 20 Å to 50 Å and 80 Å to 100 Å, surface area in the range of 100 to 200 $m_2/g$, matrix surface area in the range of 30 to 50 $m_2/g$, micro pore volume of 0.03 to 0.04 ml/g, apparent bulk density in the range of 0.7 to 0.9 g/ml, attrition index of about 1 to 5% by weight and average particle size of 60 to 80 microns.

4. The catalyst as claimed in claim 1, wherein the active elements comprise 0.2 to 0.06 wt % of V.

5. The catalyst as claimed in claim 1, wherein the active elements comprise 0.01 to 0.7 wt % of P.

6. The catalyst as claimed in claim 1, wherein the active elements comprise 0.02 to 0.07 wt % of Ni.

7. The catalyst as claimed in claim 1, wherein the active elements comprise 0.1 to 0.45 wt % of Fe.

8. The catalyst as claimed in claim 1, wherein the active elements comprise a plurality of Group V elements which comprise vanadium and phosphorous and a plurality of Group VIII metals which comprise nickel and iron.

9. The catalyst as claimed in claim 1, wherein the active elements comprise sodium as the Group I metal, magnesium as the Group II metal, aluminium as the Group IIIA metal, carbon as the Group IV A element, a plurality of Group V metals which comprise nickel and iron and rare earth oxide.

10. The catalyst as claimed in claim 9 wherein the rare earth oxide is present in the range of 0.05 to 1.2 wt %.

11. The catalyst as claimed in claim 1, wherein carbon as the Group IV A element present in the range of 0.01 to 1% by weight.

12. The catalyst as claimed in claim 1, wherein the natural clay is present in the range of 1 to 56% by weight.

13. The catalyst as claimed in claim 1, wherein the platinum metal is in an elemental form uniformly distributed within the support.

14. A process for the preparation of the catalyst as claimed in claim 1, comprising the steps of:
   (i) providing a spent catalyst as a support material, the spent catalyst having a bimodal pore size distribution in the range of 20 Å to 50 Å and 80 Å to 100 Å, surface area in the range of 100 to 200 $m_2/g$, matrix surface area in the range of 30 to 50 $m_2/g$, micro pore volume of 0.03 to 0.04 ml/g, apparent bulk density in the range of 0.7 to 0.9 g/ml, attrition index of about 1 to 5% by weight and average particle size of 60 to 80 microns;
   (ii) drying the spent catalyst step (i) by heating in glass reactor at 500° C. in air for 4 Hrs;
   (iii) incorporating the noble metal platinum on to the support material; and
   (iv) subjecting the spent catalyst with noble metal incorporated thereon to calcination.

15. The process as claimed in claim 14, wherein in step (iii) the noble metal is incorporated by equilibrium adsorption or wet impregnation method either at room temperature or at slightly above.

16. The process as claimed in claim 14, wherein after incorporation of noble metal the support material with noble metal incorporated thereon is subjected to drying at a temperature in the range of 110-120° C. for 10 Hrs.

17. The process as claimed in claim 14 wherein the spent catalyst contains carbon in the range of 0.1-1 wt %.

18. The process as claimed in claim 17 wherein carbon in the spent catalyst is burned.

19. The process as claimed in claim 18 wherein the spent catalyst comprises coke and the coke is burned in a controlled atmosphere in presence of either oxygen or air.

20. The process as claimed in claim 15 wherein the noble metal platinum is incorporated on the support material before the coke is burned.

21. The process as claimed in claim 17 wherein in step (iv) the calcinations comprises raising a temperature of the spent catalyst with platinum incorporated thereon in step wise manner up to 400°-600° C. either in air or in inert atmosphere like nitrogen.

22. The process as claimed in claim 19 wherein in step (iv) the calcinations comprises raising a temperature of the spent catalyst with platinum incorporated thereon in step wise manner up to 400°-600° C. either in air or in inert atmosphere like nitrogen.

* * * * *